Patented Feb. 20, 1945

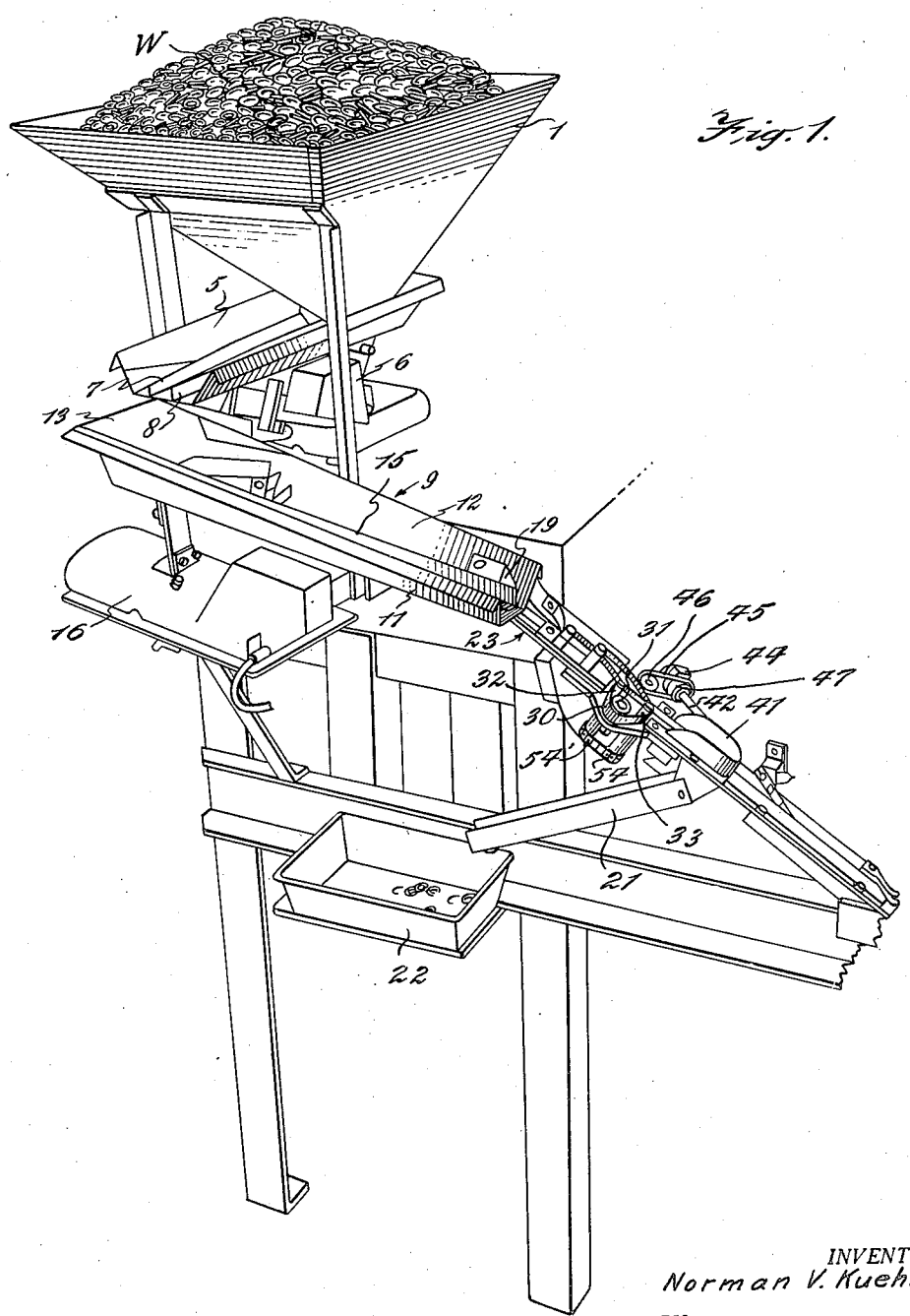

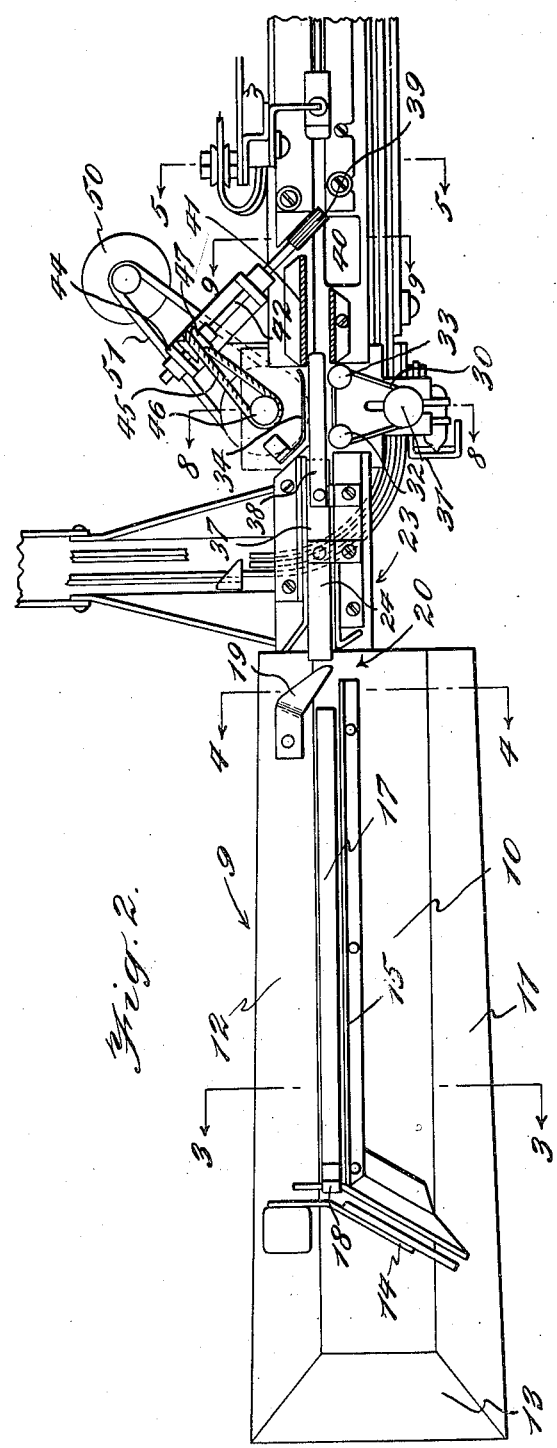

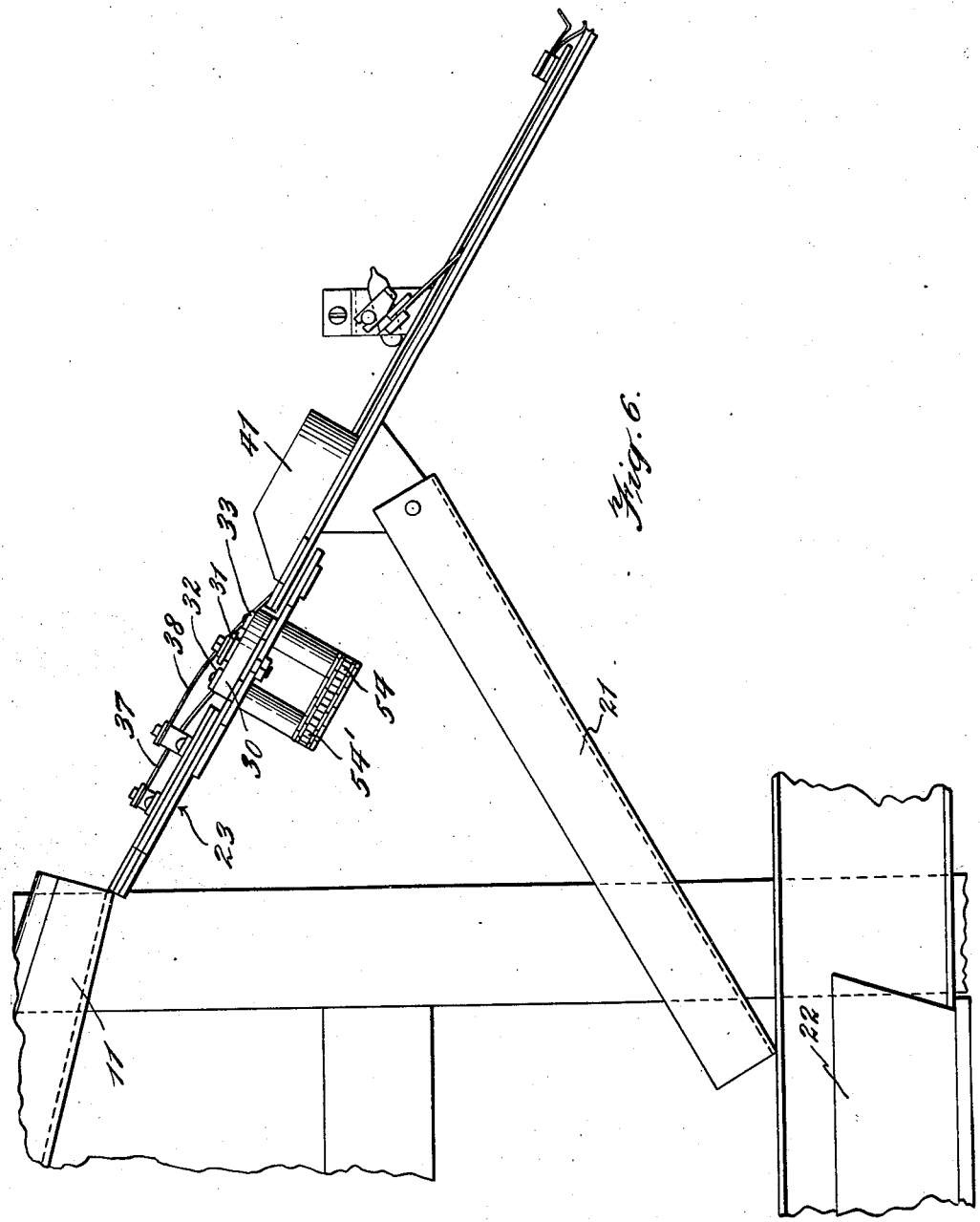

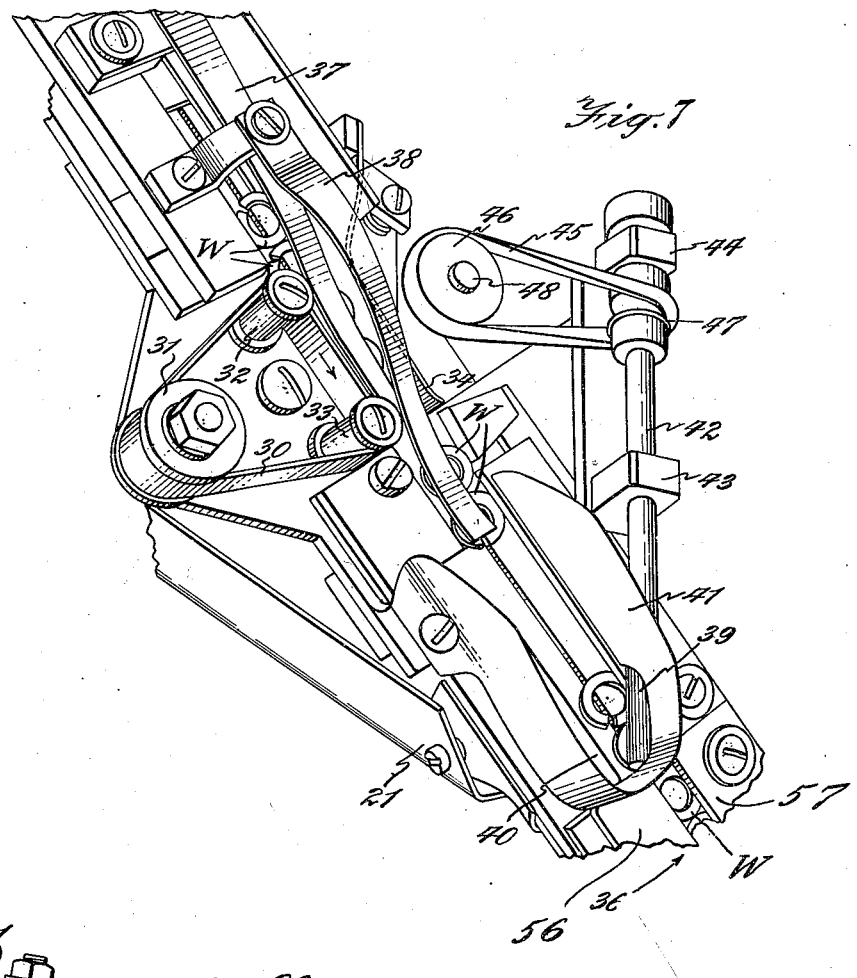
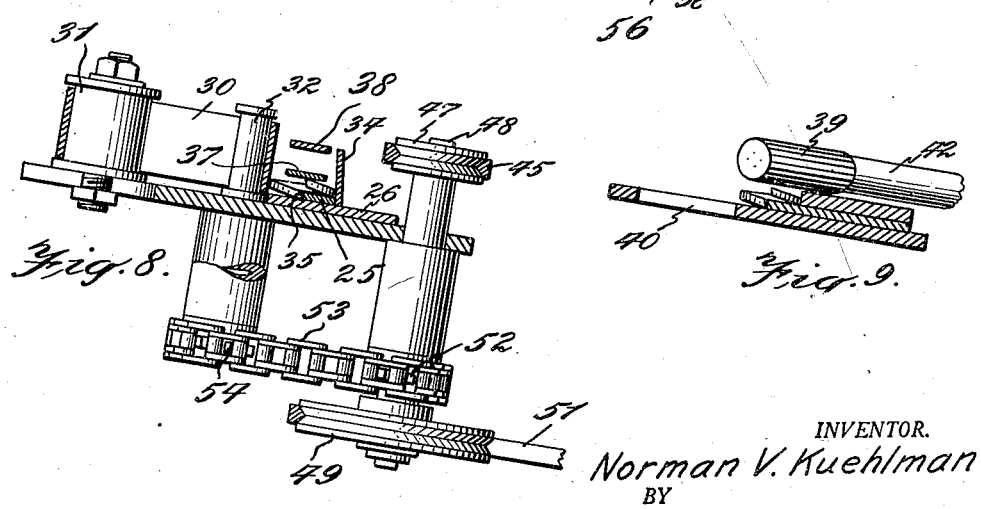
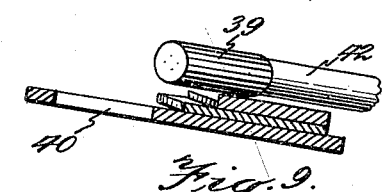

2,369,785

UNITED STATES PATENT OFFICE 2,369,785

WASHER FEED AND ORIENTING MECHANISM

Norman V. Kuehlman, Milwaukee, Wis., assignor to The National Lock Washer Company, Newark, N. J., a corporation of New Jersey Original application July 10, 1941, Serial No. 401,804. Divided and this application August 25, 1942, Serial No. 456,039

8 Claims. (Cl. 10—162)

This is a division of my application Ser. No. 401,804, filed July 10, 1941, Patent No. 2,333,940, issued November 9, 1943. The invention described and claimed herein is for a chute for conveying lock washers from a storage space to an assembly mechanism and an aligning means cooperating with said chute for aligning all of said washers in a predetermined manner.

Fig. 1 is a perspective view of part of a washer and blank assembly machine.

Fig. 2 is a plan view of part of the path of the washer to the assembly mechanism.

Fig. 3 is a section through 3—3 of Fig. 2.

Fig. 4 is a section through 4—4 of Fig. 2.

Fig. 5 is a section through 5—5 of Fig. 2.

Fig. 6 is a side elevation of part of the washer path from the washer storage space to the assembly mechanism.

Fig. 7 is a perspective view of the aligning mechanism for the lock washers.

Fig. 8 is a section through 8—8 of Fig. 2.

Fig. 9 is a section through 9—9 of Fig. 2.

Fig. 1 shows suitable storage space for washers W. This storage means comprises a hopper 1 provided to receive a substantial quantity of lock washers W which, in the illustrative drawings, are of the split-ring type. Hopper 1 is shown in the form of an inverted pyramid, but may be conical if so desired. From the hopper the washers are conveyed along the washer path or chute, which will be described in detail, to an assembly mechanism or the like (not shown). This invention is designed to be incorporated in an assembly machine for putting lock washers on bolt blanks, but is useful wherever it is desirable to convey washers from one point to another, align them in a predetermined manner and deliver them to the second point in the predetermined aligned condition.

The bottom of the washer hopper 1 is equipped with two or more baffle plates designed to relieve the mechanism immediately under the opening at the bottom of the hopper from the full weight of the superimposed lock washers. These baffles are not shown because their use in any form of storage device is common.

Underneath the opening in the lowermost part of hopper 1 is a trough 5 which is positioned close enough to the opening in the bottom of the hopper to prevent a rapid and uncontrolled pouring out of the lock washers through that opening. The trough 5 is mounted upon a vibratory mechanism 6 which serves to vibrate said trough and in this way control the flow of the washers from the hopper. The vibrating mechanism shown is sold under the trade name "Syntron" and made under U. S. Letters Patent Nos. 1,637,401 and 1,637,717.

Washer flow control is obtained by adjusting the activity of the vibrator 6. This feature is utilized to control the flow of the lock washers from the hopper 1 into the track feeder 5.

The action of the vibrating track feeder 5 is such that the washers will move along it between suitable guides 7 and 8 to the open end thereof, from which they will fall into washer vibrator 9 (Figs. 1 and 2), which is made up of a flat bottom portion 10 and two sloping side portions 11 and 12. An end wall 13 closes the left or upper end of the vibrator (as viewed in the figures). The washer vibrator 9 slopes downwardly from the left to the right, as seen in these figures, and is equipped with a suitable baffle 14 and a guide 15 designed to direct and to some extent control the flow of the washers along this vibrator.

Like feeder 5, this trough-like washer vibrator 9 is supported upon a vibrating mechanism 16 which is similar to the mechanism 6. It is so adjusted and designed as to vibrate the member 9 to maintain a steady flow of washers along the length thereof. A light steel drag 17 is pivoted at 18 and designed to rest upon some of the washers in the vibrator 9 so as to steady their movement therealong. This washer vibrator is tilted, not only downwardly, as shown in Fig. 1, but also downwardly to the left, as viewed in the direction of travel of the washers, so that the washers will tend to move toward the wall 12 as well as longitudinally of the washer vibrator.

At the lower end of the vibrator 9 is a throw-out finger 19 designed to guide rolling or tilted washers out through a discharge opening 20. From the right or lower end of the vibrator 9 those washers which do not come in contact with the finger 19 drop into a tilted chute or track 23. This chute is slightly wider and deeper than the washer. The top of the chute is furnished with another light steel drag 24 designed to rest lightly upon the washers to keep them in line. The inclination of the chute 23 is such that the washers will move along it by gravity.

At the position designated in the figures as the section through 8—8, there is located adjacent to and as part of the washer chute a mechanism for positioning each washer in the same relative position to the chute as each other washer. If the washers are of the split-ring type, as illustrated, they are preferably positioned so that the severed ends of each washer will be the leading portion of the washer as it travels down towards the assembly wheel. When so positioned, the line of washers will slide down a chute with little or no tendency for one to ride up on the washer ahead of it. In the machine illustrated, this positioning is accomplished by equipping the bottom of the chute 23 with a central ridge track (Figs. 5 and 8); that is, one side of the chute is stepped up and higher than the other side a distance approximately equal to the thickness of the stock from which the washer is made. This may be accomplished by laying a strip of metal such as at 25, on the bottom of the chute 26. The edge 35 of the strip 25 is used as a guide for one end of the split-ring washer, as shown in Figs. 5 and 8.

In order to line one end of the washers against the edge of the strip 25, a suitable aligning mechanism is provided (Figs. 7 to 9). This includes an endless flat belt 30 running over pulleys 31, 32, and 33, which pulleys are arranged in a form of a triangle so that the belt running between pulleys 32 and 33 forms the base thereof. This portion of the belt is arranged parallel to the chute 23 and adjacent thereto. Opposite the rollers 32 and 33 is a flat spring 34 (Figs. 7 and 8), the face of which is positioned on one side of the chute 23 opposite to the belt 30. The spring 34 and that part of the belt 30 operating between rollers 32 and 33 are so positioned that washers flowing along the chute 23 must pass therebetween with the outside edges of the washers in contact with both spring and belt (Fig. 8). The spring 34 holds each washer against the belt 30. As each washer passes the belt 30, it is rotated by the belt counterclockwise when viewed from above on an axis vertical to the plane of the washer until the open end thereof comes in contact with the edge 35 of the strip 25, when rotation of the washer is arrested and the positioned washer slides down along the chute into the washer magazine 36, which may be described as the lower part of the chute 23 immediately above an assembly mechanism or other device to which the washers are to be delivered. A light steel spring finger 37 (Fig. 7) holds the washers flat on the bottom of the washer chute while the washers are passing between the belt 30 and the spring 34. A similar spring 38 holds down the washers as they pass out from between belt 30 and spring 34 and keeps them in position as they move towards the magazine 36.

If, by chance, one of the washers does not assume the position shown in Figs. 5, 8, and 9 in relation to the washer chute and the edge 35 of the strip 25, but becomes tilted up in some manner, this would mean that it would be higher than in the position shown in the above-mentioned figures and the clearing wheel 39 would then strike it, throwing it through a suitable opening 40 and into the discharge chute 21, from which it will drop into the receptacle 22. At 41 is shown a suitable stop or semi-enclosure to guide the discarded washers to the opening 40. The washer chute or track 23 is tilted downwardly to the left as one looks in the direction of travel of the washers or downwardly to the right as seen in the opposite direction (see Fig. 9), and this serves to prevent washers which are properly aligned from falling through the opening 40.

Wheel 39 is part of a shaft 42 mounted in bearings 43 and 44 and driven by belt 45 which operates on pulleys 46 and 47. Pulley 46 is mounted on a shaft 48, to the lower end of which is keyed another pulley 49 belted to a motor 50 (Fig. 2) by belt 51. Shaft 48 has mounted thereon a chain sprocket 52 over which runs a roller chain 53 connected to a pair of sprockets 54 and 54' (Figs. 6 and 8). Sprocket 54' is keyed to the shaft which supports pulley 32, and sprocket 54 is keyed to the shaft which supports pulley 33. In this manner, motor 50 drives the clearing wheel 39 and also the belt 30.

After a washer passes under the clearing wheel without interference therefrom, as shown in Fig. 9, it goes into the washer reservoir 36, which is a chute similar to chute 23, but with two strips of metal running along the top, as shown in Fig. 5 at 56 and 57. As will be seen in these figures, the strips 56 and 57 project over the path of the washers and serve to hold the washers in place as they move towards the assembly wheel.

While it is desirable, it is not essential, that all of a series of split-ring washers shall have their ends against the edge 35. Therefore, in practice, it is found convenient to raise clearing wheel 39 and strips 56 and 57 above the positions where they permit the passage of those washers only whose severed ends actually contact edge 35 to a higher position so that washers which are not fully in the desirable position can nevertheless pass into the washer magazine and to the assembly mechanism or other device to which the washers are to be directed.

In operation, the washers drop from the hopper 1 to the chute 5 which is vibrated to encourage their flow therealong and from the end of chute 5 they drop into washer vibrator 9. When they reach the lower end of washer vibrator 9, those which are tilted or lying edgewise will be rejected by arm 19 and will pass through opening 20. The remaining washers will pass down into chute 23. As they pass along chute 23, they will come in contact with the belt 30 and spring 34 and will be rotated until one end of the washer is brought up against edge 35 of strip 25 and, so aligned, the washers will pass down along the chute 23 to the washer magazine 36. If by any chance a washer is misaligned, it will be higher than the other washers and will come in contact with the rotating clearing wheel 39 as it attempts to pass thereunder. The clearing wheel will reject such misaligned washer and force it out through opening 40.

While I have shown the invention as embodied in a specific form, it is to be understood that various changes in details may be made without departing from the scope of the invention as defined by the appended claims.

I claim:

1. In a device of the character described, a track along which a series of washers having a non-circular periphery may be moved, aligning means comprising moving means to rotate each washer as it travels along said track, said means adapted to move in a direction parallel to said track, and a stop to engage a non-circular part of the washer, when the washer is rotated, to prevent further rotation thereof.

2. In a device of the character described, a track along which a series of split-ring washers may be moved, aligning means comprising a moving belt arranged to engage the edge of each washer detachably as the washer travels along said track whereby the washer is rotated on its axis, and a wall in said track extending parallel to the line of travel of the washers and arranged to be contacted by an end of each washer, when the latter is rotated, to prevent further rotation thereof and to guide said washers in alignment in the further travel thereof along said track.

3. In combination, aligning means comprising a track along which an irregularly-shaped article may travel, a surface on said track disposed substantially at right angles to the bottom of said track, and movable means for rotating said article as it passes along said track until a portion of said article contacts said surface to prevent further rotation thereof, said surface being a part of said track.

4. In combination with a stationary track along which irregularly-shaped articles may travel, aligning means comprising a belt adapted to rotate an article as it travels along said track, and a stop which is part of said track adapted to engage a part of said article to limit the rotation thereof.

5. In a device of the character described, a track along which a series of split-ring washers may be moved, aligning means comprising belt means to rotate each washer as it travels along said track, and a stop which is part of said track to engage an end of the washer when rotated to prevent further rotation thereof.

6. In a device of the character described, a track along which a series of split-ring washers may be moved, aligning means comprising means adapted to move in the direction of washer travel to rotate each washer as it travels along said track, and a stop to engage an end of the washer when rotated to prevent further rotation thereof, said stop comprising a surface extending along said track parallel to the line of travel of said washers.

7. In a device for conveying and aligning washers having a non-circular periphery, a track along which a series of such washers may be moved, aligning means comprising means to rotate each washer as it travels along said track, spring means on the other side of said track adapted to cooperate with said aligning means to force each washer into engagement with said aligning means, and a stop to engage a non-circular part of the washer to prevent further rotation thereof.

8. In a device of the character described, a track along which a series of split-ring washers may be moved, aligning means comprising a moving belt arranged to engage the edge of said washer tangentially as the washer travels along said track whereby the washer is rotated on its axis, a flat spring adapted to cooperate with said belt to force each washer into engagement with the belt, and a wall in said track extending parallel to the line of travel of the washers and arranged to be contacted by an end of each washer when the latter is rotated to prevent further rotation thereof and to guide said washers in alignment in the further travel thereof along said track.

NORMAN V. KUEHLMAN.